Aug. 29, 1967  G. B. KARNOFSKY  3,338,064
ICE MELTING SYSTEM
Filed Nov. 24, 1961  4 Sheets-Sheet 2

INVENTOR
GEORGE B. KARNOFSKY

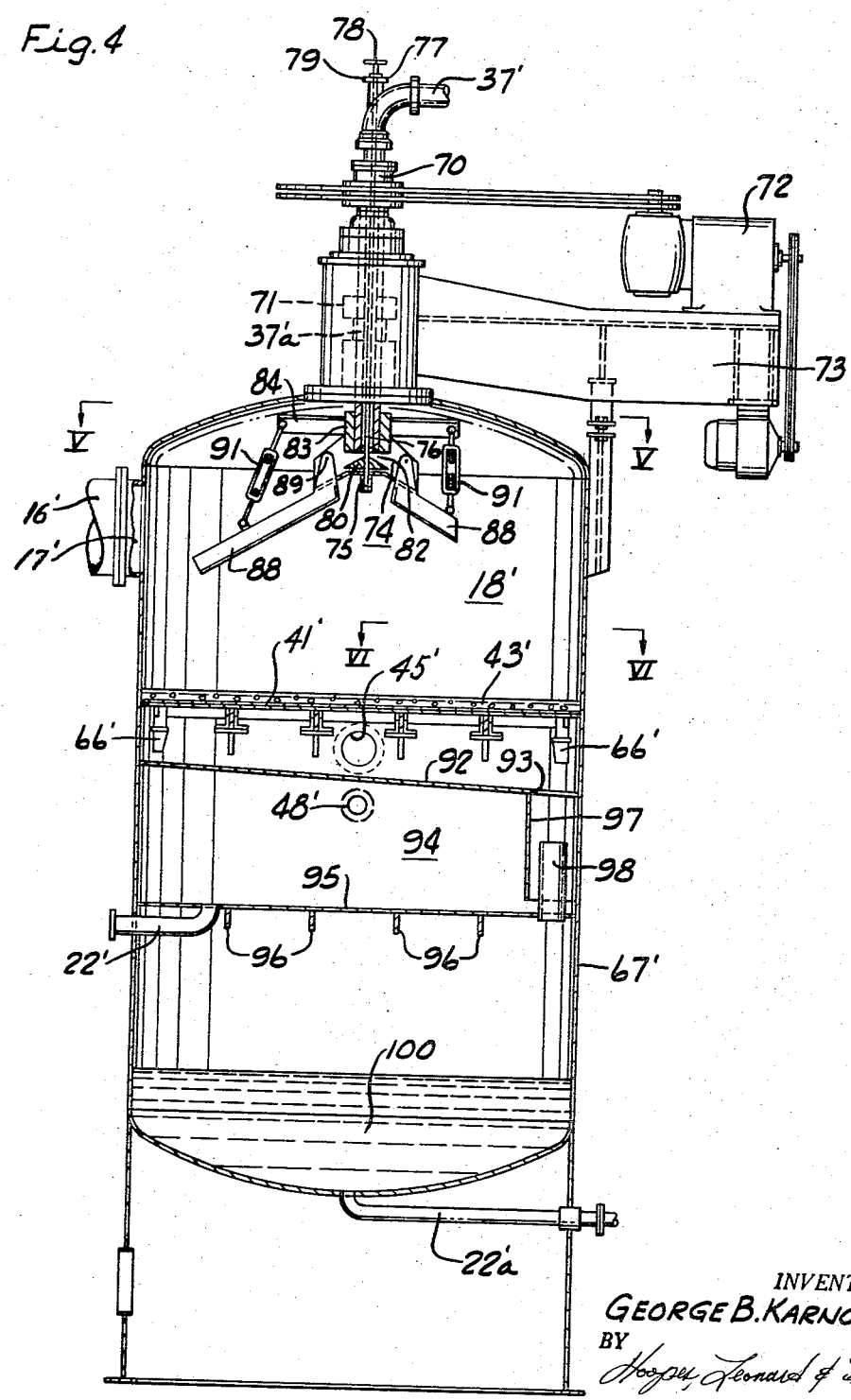

Aug. 29, 1967   G. B. KARNOFSKY   3,338,064
ICE MELTING SYSTEM
Filed Nov. 24, 1961   4 Sheets-Sheet 4
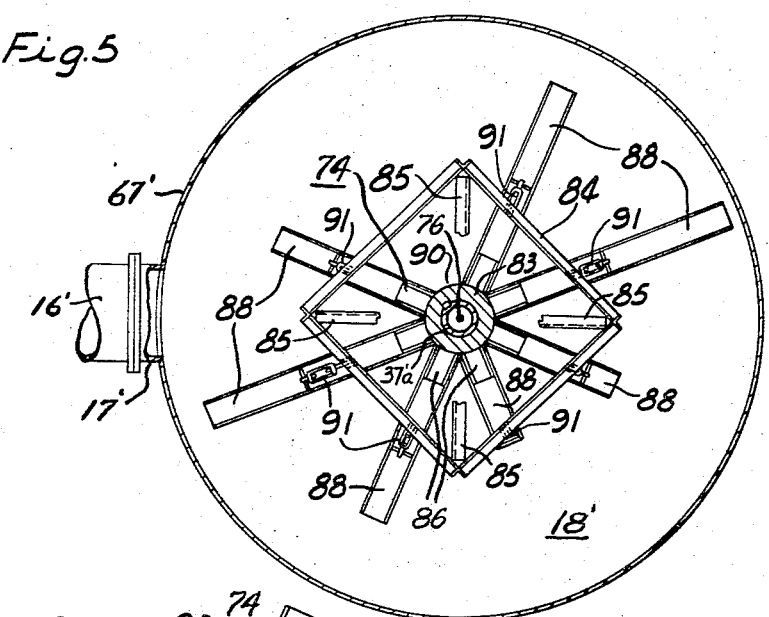
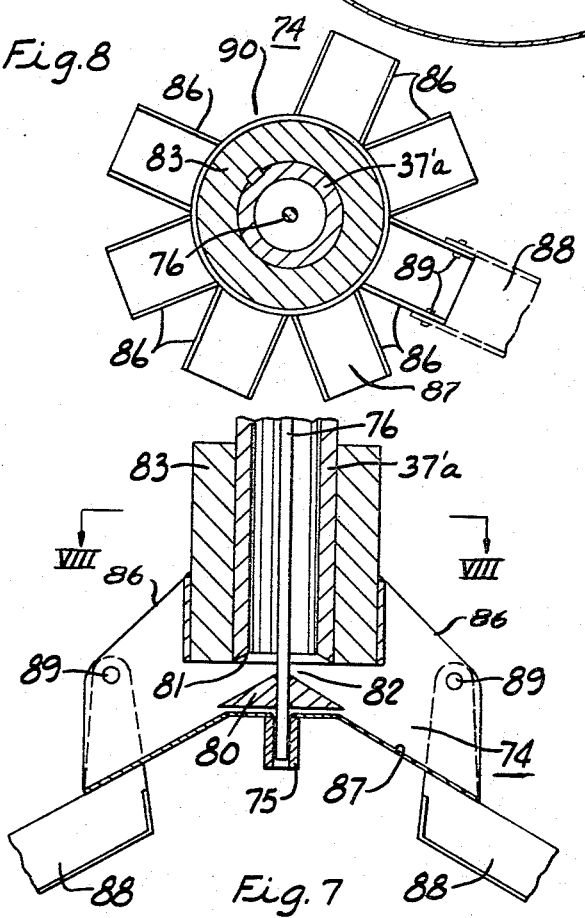
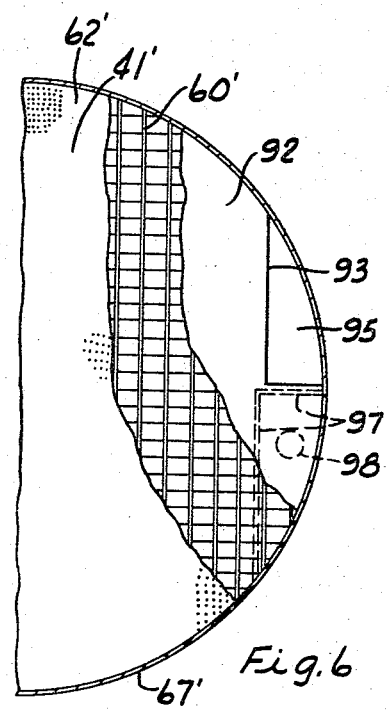
INVENTOR.
GEORGE B. KARNOFSKY
BY
HIS ATTORNEYS United States Patent Office 3,338,064
Patented Aug. 29, 1967

3,338,064
ICE MELTING SYSTEM
George B. Karnofsky, Mount Lebanon Township, Allegheny County, Pa., assignor to Blaw-Knox Company, Pittsburgh, Pa., a corporation of Delaware
Filed Nov. 24, 1961, Ser. No. 154,502
16 Claims. (Cl. 62—58)

This invention relates to method and apparatus for preferably continuously melting ice in particulate or crystal form (as distinguished from massive blocks or cakes) produced in the freezing of saline water. More particularly, this invention pertains to a melting system utilizing the condensible vapor of a refrigerant fluid for contact melting of particles of such ice. Such refrigerant vapor may conveniently be the vapor of refrigerant used to freeze the saline water, compressed to a press suitable for the melting of ice.

The production of solute-free ice by means of partial freezing from saline waters such as sea water, brackish water, or other aqueous solutions including sugar solutions and/or fruit juice, may be readily and efficiently obtained by a practice of the invention disclosed in my copending application entitled "Freeze Concentration and Separation System" for United States Letters Patent Ser. No. 154,503, filed Nov. 24, 1961, now Patent No. 3,170,779. Such ice crystals have been amply washed and are solute-free under all normal conditions. The refrigerant vapor evolved by freezing the ice in such systems must be condensed in an economical manner for re-use in further freezing. This invention provides an economical and continuous system capable of melting ice on the scale desired, and simultaneously condensing and recovering the refrigerant vapor.

Other objects, features and advantages of this invention will be apparent from the following description and the accompanying drawings, which are illustrative only, in which FIGURE 1 is a flow diagram of a system for the recovery of relatively solute-free solvent, such as salt-free water, from a solution by freeze concentration and a melting system embodiment of this invention in a continuous cycle ice melting operation;

FIGURE 4 is a view in elevation and vertical section through the axis of a variant form of melting vessel embodiment utilizable in a smaller capacity melting system of this invention;

FIGURE 5 is a view taken along line V—V of FIGURE 4;

FIGURE 6 is a partial view taken along line VI—VI of FIGURE 4 with a portion broken away to illustrate a construction detail;

FIGURE 7 is a detail view in elevation and vertical section of a portion of a distributor for the vessel of FIGURE 4; and FIGURE 8 is a view taken along line VIII—VIII of FIGURE 7.

Figure 1:
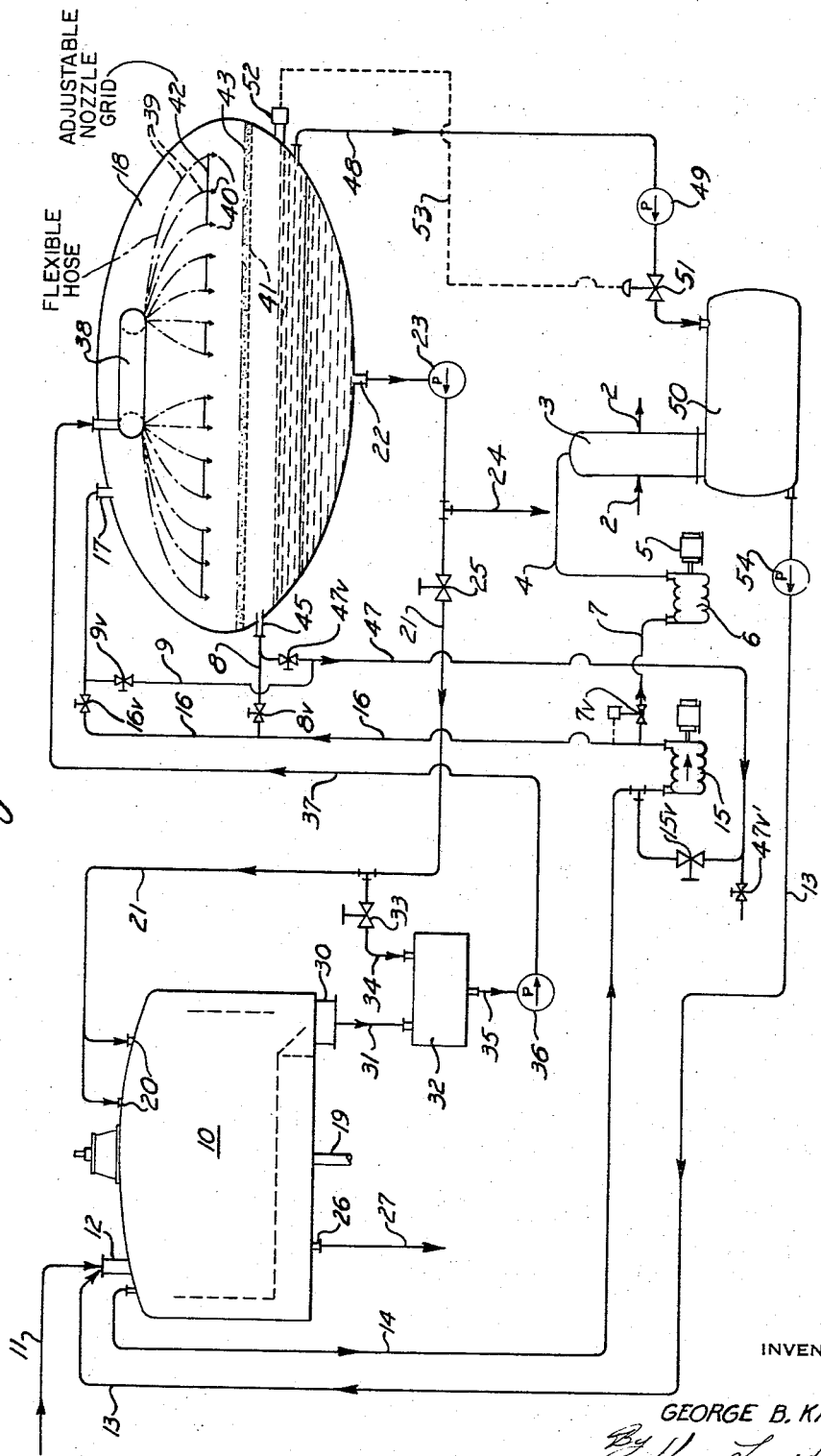

Referring to FIGURE 1 of the drawings, there is illustrated therein a freezer-washer 10 of any desired construction which may, for example, be that set forth in my aforesaid application Ser. No. 154,503. Therein a solution such as sea water, brine or brackish water, is introduced under pressure through a pipe 11 into a pressure ejector mixing nozzle inlet 12 where it is admixed with a liquid refrigerant of a vaporizable material such as butane, preferably normal butane, introduced through a pipe 13. The selected flows through pipes 11 and 12 and the physical conditions thereof and in vessel 10 are such that substantially all of the butane is vaporized and a selected fraction of the saline water is frozen into relatively salt-free ice leaving a more concentrated brine or saline water as the residual liquid. The vaporized butane or other refrigerant exits from vessel 10 through a vapor outlet conduit 14 from whence it is conducted to a vapor compressor 15 and discharged through a pipe 16 and vapor inlet 17 as higher pressure vapor into a spheroidal melting vessel 18 comprising one element of a melting system of this invention. Any known ice producing and/or washing means other than device 10 may be utilized in a cooperation with a melting system practice of this invention.

Within device 10, a plurality of ice carrying cells in horizontally endless arrangement are rotated continuously, or intermittently if desired, by a shaft 19, such cells successively receiving the freeze slurry, the ice in which is subsequently washed by a peripheral series of wash liquid nozzles above such cells at wash liquid inlets 20. Such wash liquid inlets are supplied with wash water of selected and respective quality through pipes such as pipe 21, which pipe 21 receives some product water as final wash water. Product water is produced in vessel 18 by melting and drains into the bottom of the vessel where it is withdrawn through a product water outlet 22 leading to a pump 23 which sends the bulk or all of such product water to a place of use or storage through a product water pipe 24. A relatively small portion of such product water as controlled by a valve 25 may be pumped instead to pipe 21 for the final wash step in washer 10. Concentrated saline water drained from the cells in device 10 is drawn out through an outlet 26 and a pipe 27.

A discharge hopper 30 in washer 10 receives washed, substantially drained ice successively from the respective cells as they pass thereover and the perforated bottom doors of each thereof open. Such ice is dumped through a conduit 31 into a product slurry tank 32 to which product water in controlled amount may also be supplied through a pipe 34 regulated by a valve 33 to insure flowability of the product quality ice slurry in tank 32. The product ice slurry is removed from tank 32 through a pipe 35 and pumped by a pump 36 through a pipe 37 to the interior of a ring manifold 38. The ring manifold is provided with branch pipes 39, which may be flexible hoses, communicating with the interior thereof and terminating in slurry distribution nozzles 40 arranged in regular fashion over an ice support plate 41 and held in position in vessel 18 by suspended rigid grid frames 42.

The "liquidity" of the product ice slurry distributed by the nozzles 40 preferably is such that on support plate 41, the product ice slurry is self-leveling and distributes itself uniformly as a relatively thin porous bed 43 of washed ice, slurry water of product specification therewith immediately draining through perforations in plate 41 to the bottom of vessel 18. Such ice on plate 41 is relatively rapidly melted over the whole surface thereof by compressed butane vapor penetrating the interstices among the particles of ice in that bed 43. Such vapor may be admitted above, or below, the bed 43 to flow downwardly or upwardly thereinto, respectively.

In the case of downflow melting, compressed butane vapor is delivered by compressor 15 through a pipe 16 and an open valve 16V therein to fitting 17 affording admission of such vapor to the interior of vessel 18 above the bed. Pipe 16 is connected to a further fitting 45 on the underside of bed 43 and plate 41 by branch 8 having a valve 8V therein which is closed during a downflow operation. Fitting 45 is also connected by a pipe 47 through a valve 47V for optional return to the inlet side of compressor 15, or through a valve 47V′ to exhaust or vent. Valve 47V is always open during a downflow operation, while valve 47V′ is closed and valve 15V is open if the uncondensed vapor, if any, is to be recompressed for reuse; if not, then valve 47V′ is open and valve 15V is closed. Similarly, a branch pipe 9 having a valve 9V therein connects fitting 17 to pipe 47, valve 9V normally being closed during a downflow operation. Any uncondensed vapor during downflow which passes into the space immediately below plate 41 is discharged through fitting 45 and pipe 47 as aforesaid.

In the case of an upflow operation, valves 16V and 47V are closed, valves 8V and 9V are open, so that compressed vapor enters fitting 45 and passes upwardly through the perforations in plate 41 and bed 43. Any uncondensed vapor entering the space above bed 43 is removed through fitting 17 and pipe 9 leading to pipe 47. Whether the melting is done by downflowing vapor, or by upflowing vapor, heat exchange occurs between the refrigerant vapor and the ice in bed 43, melting the ice and condensing the refrigerant when it is a substance like butane. All liquids quickly drain down and out of the bed through the perforated plate 41 into the bottom of vessel 18 as product water and liquid butane respectively.

Product water from melted ice and liquid butane which have drained to the bottom of vessel 18 separate by gravity, such bottom acting in the manner of a separating chamber or decanter. Liquid butane rises to the top of the two liquids, is drawn out through a pipe 48 and pumped by a pump 49 to a butane surge tank 50 under the control of a valve 51 when it is opened, such valve being in liquid level control relation with a level controller 52 through an impulse line 53 to maintain a predetermined level of liquid in the bottom of vessel 18. Further, pipe 16 is connected by a branch 7 to a secondary compressor 6 driven by a prime mover 5 to receive compressed butane vapor when an automatic pressure control valve 7V opens. Compressor 6 further compresses the entering vapor and discharges it through a pipe 4 into shell-and-tube type condenser 3 in which the fluid discharged from compressor 6 is liquefied and runs down into tank 50. Cooling water pipes 2 provide the requisite cooling medium. Butane liquid from surge tank 50 is pumped by a pump 54 into pipe 13 and nozzle 12 at required pressure and in the required quantity, completing an illustrative cycle of operations utilizing a melting system practice of this invention.

Figure 2:
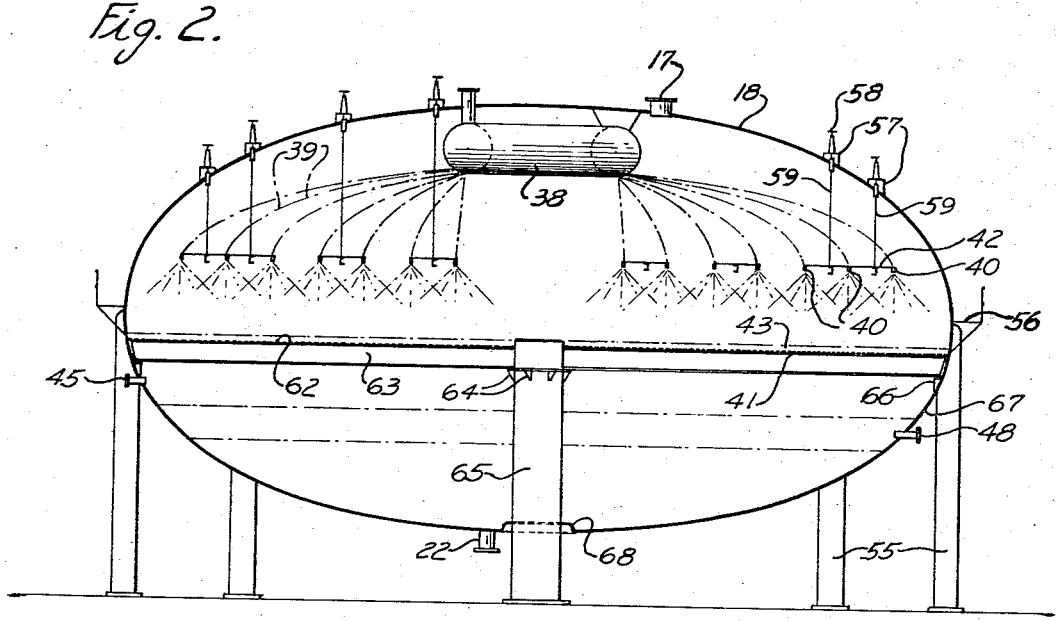
FIGURE 2 is a view in elevation and vertical section along the axis of the relatively large capacity melting vessel illustrated in FIGURE 1.
Figure 3:
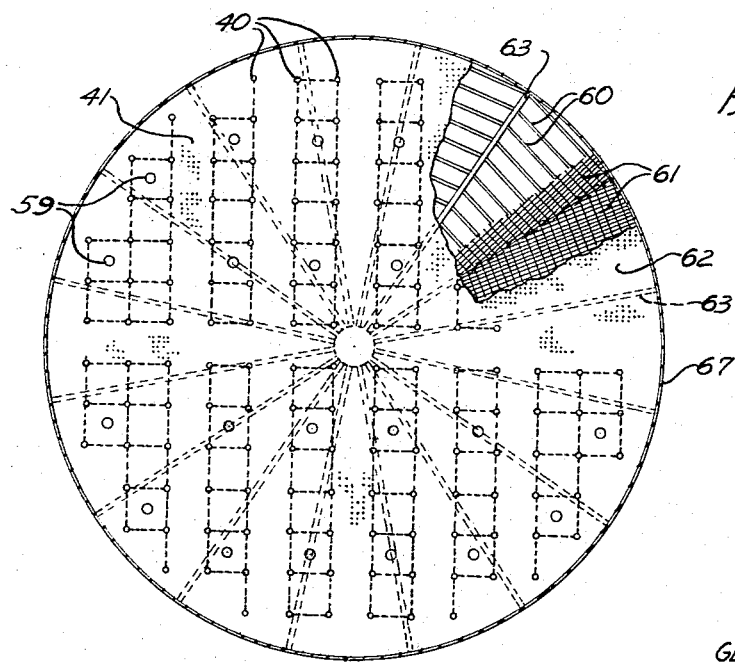
FIGURE 3 is a view in plan of the principal ice supporting member in the vessel shown in FIGURE 2 with part of such supporting member broken away to illustrate one construction thereof.

FIGURES 2 and 3 illustrate vessel 18 of FIGURE 1 somewhat more completely and the reference numerals applied thereto in FIGURE 1 are applied to the same parts in FIGURES 2 and 3. Vessel 18 may be supported on structural frame legs 55 and provided with a walkway 56 therearound, suitable insulation, light and sight glasses being provided as well as ladders to the respective floor stands 57 for raising and lowering the respective grid frames 42 illustrated in dotted lines in FIGURE 3, such frames being symmetrical to each side of a vertical line on FIGURE 3 through its center. The floor stands 57 include a hand wheel 58 affixed to a threaded stem which correspondingly raises and lowers a rod 59 attached at one end to such a floor stand and at the other to a grid 42 therebeneath. The nozzles 40 are arranged generally at the respective intersections of the grid frame members and it may be noticed by consideration of FIGURE 3, how product ice slurry discharged from such nozzles 40 in spray fashion as indicated by the dotted lines in FIGURE 2 will cover the entire area of bed 43 simultaneously, self-level itself and immediately drain itself of liquid to leave the bed substantially continuously as a drained ice bed undergoing melting by contact with the condensable refrigerant introduced therein above or below the whole surface and the depth thereof, as the case may be, any vaporized refrigerant remaining uncondensed, usually a negligible quantity, exiting through fitting 45, or fitting 17, respectively.

Support plate 41 comprises a grating base 60 to which a coarse screen 61 may be attached with a finer screen 62 overlying the coarser screen. The edges of the grating sectors comprising base 60 are in the form of beams 63 extending between brackets 64 on a central support pillar 65 and brackets 66 around the inside of a spheroidal shell 67 of vessel 18, the whole being a rigid structure. A dished expansion plate 68 is provided at the bottom of vessel 18 around pillar 65 and completes the pressure sealed nature thereof. Liquid entering vessel 18 or generated within bed 43 will immediately drain out through the screens and grating of support plate 41 leaving further voids among the ice particles for the melting action of the condensible vapor, which preferably is the refrigerant utilized in the freeze concentration action producing the solute-free ice undergoing melting hereunder.

In a variant form of melting and decanting vessel illustrated in FIGURES 4 to 8, inclusive, parts corresponding generally in functioning, even though different in structural form, to those illustrated in FIGURES 3 and 4, are provided respectively with the same reference numerals with the addition of a prime accent thereto. Thus, a vessel 18′ having a pressure shell or casing 67′ receives solute-free ice in a slurry with water of product specification. Such slurry enters vessel 18′ through pipe 37′ and a tube 37′a extending downwardly through a rotary pressure joint 70 and an enclosed support bearing 71 for the rotatable portion of joint 70 to which the rotatable portion of tube 37′a is attached. A prime mover 72 mounted on a bracket 73 rotates tube 37′a at an appropriate selected speed and thereby rotates a product ice slurry distributor 74 at selected speed.

A guide sleeve 75 at the lower end of distributor 74 forms a slidable guide for an inlet opening control rod 76, the upper end of which is threaded and passes through a stationary nut in cap 77. The upper end of rod 76 is provided with a handwheel or other handle 78 and a lock nut 79 is threaded on the rod below handle 78 to lock nut 77 and rod 76 at the selected height. Rod 76 carries a conical baffle 80 fixed thereto adjacent the bottom thereof to cooperate with a beveled bottom edge 81 at the lower end of tube 37′a. Movement of rod 76 to a desired height selectively fixes the size of the annular opening 82 between baffle 80 and edge 81 to control the rate of admission of the flow of product ice slurry passing downwardly from pipe 37′ into and through rotating feed pipe 37′a. Rod 76 also can be raised sufficiently to make baffle 80 engage edge 81 and close the lower end of tube 37′a whenever it may be desired.

Distributor 74 comprises a hub 83 keyed and fixed to the lower end of tube 37′a to rotate therewith. Hub 83 carries a rectilinear frame 84 by means of spider arms 85 extending between said frame and hub 83 to rigidly fasten them together. Below frame 84, hub 83 is rigidly connected to stub members 86 comprising U-shaped radial troughs with downwardly and outwardly sloping floors 87 to guide product ice slurry into a respective plurality of radial trough arms 88, also U-shaped in cross section, and pivotally connected to the walls of the stub troughs by horizontal pivot pins 89. In one angular position 90 around hub 83 there is no stub trough and no trough arm. The trough arms 88 are of respectively different radial lengths and the slope of each thereof is controllable by a turn buckle 91 pivotally connected between frame 84 and the respective trough arms 88 outwardly of the respective pivots 89. Thereby, the slope of each trough arm can be individually controlled so that in the rotation of distributor 74 product ice slurry issuing from opening 82 will be fed generally uniformly through all of the respective trough arms 88 to each side of the gap 90 and gap 90 to deposit slurry on support plate 41′ over the entire area thereof to a substantially uniform depth, such being aided by the flowable "self-levelable" quality of the product ice slurry. Support plate 41' comprises a bottom grating layer 60' mounted on and fixed to brackets 66' of vessel 18'. A perforated plate member 62' rests on grating 60' and is fastened thereto to complete support member 41', the perforations in plate 62' serving as a plurality of drain openings to enable liquid quickly to run therefrom and drain off a relatively thin bed of ice 43' deposited on plate 41' by the distributed product ice slurry.

In the second illustrated embodiment, a sloping baffle 92 is positioned below plate support 41' and receives all of the drainings through that plate and guides them to a segmental opening 93 on one side at the lowest edge of the baffle into a decanter section 94 closed on the bottom by a circular plate 95 supported on cross bars 96. As pointed out in connection with the operation of vessel 18, melting of ice in the bed 43' in vessel 18' by contact with condensible vapor entering through inlet 17' causes the melted ice and condensed vapor, such as liquid butane, to drain quickly through support 41', both liquids encountering baffle 92 and draining off through opening 93 into decanter section 94. Decanter 94 is provided with a hanging curtain 97 which entirely surrounds a riser pipe 98 having its outlet through bottom 95. Hence, water and butane liquid enter decanter 94 outside of curtain 97 and separate therein, the condensed vapor rising to the top of the two liquids where it can be withdrawn through an outlet 48' in section 94. Water in decanter 94 passes beneath the lower edge of the curtain 97 after operation gets underway, there being enough water admitted to decanter 94 initially to reach such lower edge, and overflows the top of pipe 98 surrounded by curtain 97 water spilling over into pipe 98 falls into a water storage section 100 at the bottom from which it may be periodically or continuously drawn off through outlet 22'a. Alternatively, product water may be removed from decanter 94 directly through outlet 22'.

In the illustrated embodiments of the melting system of this invention, various changes may be made in details thereof and other embodiments and/or piping provided, without departing from the spirit of my invention or the scope of the appended claims.

I claim:

1. Ice melting apparatus comprising, in combination, a spheroidal casing, a perforated support extending across the interior of said casing between the top and bottom thereof, means for supplying product ice slurry to the interior of said casing above said support, a distributor for said slurry to distribute the same as a substantially self-leveling bed of relatively uniform thickness over the surface of said support, means for admitting a condensible vaporized refrigerant immiscible in melted product ice to the interior of said casing above said support, means for collecting liquids draining through said support in said casing for gravity separation below said support and means at different levels of said casing below said support for removing condensed refrigerant and melted produce ice respectively.

2. Ice melting apparatus comprising, in combination, a spheroidal casing, a perforated support extending across the interior of said casing between the top and bottom thereof, means for supplying product ice slurry to the interior of said casing above said support, a distributor for said slurry to distribute the same as a substantially self-leveling bed of relatively uniform thickness over the surface of said support, means for admitting a condensible vaporized refrigerant immiscible in melted produce ice to the interior of said casing above said support, means for collecting liquids draining through said support in said casing for gravity separation below said support and means at different levels of said casing below said support for removing condensed refrigerant and melted product ice respectively, said distributor comprising a manifold, a grid having spaced nozzles positioned over the entire area of said support and flexible hoses connecting said manifold and nozzles respectively and means for adjusting the height of said grids above said support.

3. Apparatus as set forth in claim 1 in which, said casing is vertical and cylindrical, said means for supplying includes a product ice slurry opening and means for adjusting the size of the opening for said product ice slurry, said distributor comprises a plurality of angularly spaced troughs and pivotally connected trough arms of different lengths, means for adjusting the slope of said trough arms, and means for rotating said distributor.

4. Ice melting apparatus comprising, in combination, a vertical axis casing, a perforated circular support extending across the interior of said casing between the top and bottom thereof separating ice crystals from melted ice, means for supplying a product ice slurry to the interior of said casing about said support, a distributor for said slurry to distribute produce ice in a relatively uniform substantially self-leveling generally horizontal bed over the entire surface of said support, said distributor having a plurality of angularly spaced troughs and pivotally connected trough arms of different lengths, means for rotating said distributor, means for adjusting the rate of feed of said product ice slurry, means for admitting a condensible vaporized refrigerant to the interior of said casing above said support to melt said product ice entirely, and means in said casing for collecting and separating liquids draining through said support into the lower portion of said casing.

5. Ice melting apparatus comprising, in combination, a round vertical casing, a round perforated liquid draining ice-supporting support extending generally horizontally across the interior of said casing intermediate the top and bottom thereof separating ice crystals from melted ice, means for supplying ice to the interior of said casing above said support, a distributor having a plurality of angularly spaced troughs with trough arms to spread said ice over said support in a bed of relatively uniform thickness, means for adjusting the rate of feed of said ice, means for admitting condensible vaporized refrigerant immiscible in melted ice into said casing adjacent said support, a liquid directing baffle in said casing having a drain opening therein below said support to collect and drain liquid passing through said support into said drain opening, a decanter chamber extending across the interior of said casing below said baffle, and means in said casing for removing condensed refrigerant and melted ice from the interior of said casing at different levels below said baffle.

6. Apparatus as set forth in claim 5 in which, said baffle is sloped toward said drain opening, a hanging curtain and riser spill pipe for gravity spillover of melted ice is provided adjacent said decanter chamber, means are provided for removing condensed refrigerant from said decanter chamber, a product chamber for melted ice into which said spill pipe discharges is provided in said casing below said decanter chamber, and means are provided for removing melted ice optionally from said respective chambers.

7. Method of melting ice comprising, in combination, feeding a self-leveling produce ice slurry onto a perforated draining support in a vapor-tight zone, distributing said slurry in a bed of relatively uniform thickness over the surface of said support, draining liquid continuously from said bed through said support to provide gas penetration voids in said bed, introducing condensible vaporized refrigerant into said bed from above to enter said voids and melt said ice and condense said refrigerant, collecting melted ice and condensed refrigerant below said support in said vapor-tight zone.

8. Method as set forth in claim 7 comprising collecting said melted ice and condensed refrigerant in a settling and decanting zone, said refrigerant being immiscible in melted ice, and withdrawing condensed refrigerant from one level of said last-named zone and melted ice from another.

9. Method for making fresh water from saline water comprising, in combination, flash freezing in a washing zone an admixture of saline water and vaporizable immiscible liquid refrigerant to form a feed slurry containing particles of salt-free unwashed ice and more concentrated saline water, depositing said unwashed ice in individual masses for relative movement below a succession of washing stations in said washing zone, washing and draining said masses of ice successively in said washing zones to remove adherent saline water therefrom while progressing from saline wash liquid to salt-free wash liquid provided by said washing stations, successively transferring said masses of washed ice into a produce ice slurry zone, forming a product ice slurry in said last-named zone by providing salt-free product water to said washed ice in an amount sufficient to make said product ice slurry flowable, removing vaporized refrigerant from said washing zone for compression to a higher pressure vaporized refrigerant, introducing said product ice slurry into a melting chamber separated horizontally by a perforated support capable of separating ice from water, distributing said product slurry onto a perforated draining support in a relatively thin uniform bed on said perforated support, continuously draining liquid from said thin bed in said melting chamber substantially as fast as said liquid is formed, introducing said higher pressure vaporized refrigerant into said melting chamber adjacent said bed to melt ice in said bed and condense said higher pressure vaporized refrigerant, and collecting liquid draining from said bed in said melting chamber for gravity separation of condensed refrigerant and melted ice and separately removing said condensed refrigerant and melted ice from said melting zone.

10. Method as set forth in claim 9 comprising further, introducing said higher pressure vaporized refrigerant above said bed, withdrawing a portion of said melted ice from said settling zone and sending it to said product ice slurry zone, withdrawing said condensed refrigerant from said settling zone and pumping it for admixture with further saline water for said flash freezing.

11. Method for making concentrate containing ice from solutions and melting said ice comprising, in combination, flash freezing in a washing zone an admixture of solution and vaporizable liquid refrigerant to form a feed slurry containing solute-free unwashed ice and more concentrated solution, removing vaporized refrigerant from said flash freezing from said washing zone, depositing said unwashed ice in individual masses for relative movement below a succession of washing stations in said washing zone, washing and draining said masses of ice in said washing zone to remove adherent solution therefrom, successively transferring said masses of washed ice into a melting chamber separated horizontally by a perforated support capable of separating ice from water, distributing said washed ice onto a perforated draining support in a thin bed of relatively uniform thickness on said perforated support, continuously draining liquid from said thin bed in said melting chamber substantially as fast as said liquid is formed, introducing said vaporized refrigerant into said melting chamber adjacent said bed to melt said washed ice and condense said higher pressure vaporized refrigerant, and separating said melted ice and condensed refrigerant in said chamber below said perforated support.

12. Method as set forth in claim 11 in which said vaporized refrigerant is introduced into said melting zone above said bed.

13. Method as set forth in claim 11 in which said vaporized refrigerant is introduced into said melting zone below said bed.

14. Method of melting ice comprising, in combination, providing and feeding a self-leveling product ice slurry onto a horizontal draining support intermediate the top and bottom of a vapor tight chamber, distributing said slurry onto a perforated draining support in a bed of relatively thin uniform thickness over the surface of said support, draining liquid continuously from said bed through said support substantially as fast as said liquid is forming to provide gas penetration voids in said bed, introducing condensible vaporized refrigerant into said bed from below to enter said voids and melt said ice and condense said refrigerant, collecting melted ice and condensed refrigerant below said support in said chamber out of contact with said bed.

15. Ice melting apparatus comprising, in combination, a vertical axis casing, a perforated circular support extending across the interior of said casing between the top and bottom thereof, means for supplying a product ice slurry to the interior of said casing about said support, a distributor for said slurry to distribute product ice in a relatively uniform bed over the entire surface of said support, said distributor having a plurality of angularly spaced troughs and pivotally connected trough arms of different lengths, means for rotating said distributor, means for adjusting the rate of feed of said product ice slurry, means for admitting a condensible vaporized refrigerant to the interior of said casing below said support and means for collecting liquids draining through said support in the lower portion of said casing.

16. Ice melting apparatus comprising, in combination, a casing, a perforated support extending across the interior of said casing between the top and bottom thereof, means for supplying product ice slurry to the interior of said casing above said support, a distributor for said slurry to distribute the same as a relatively thin self-leveling bed of relatively uniform height over the surface of said support, means for admitting a condensible vaporized refrigerant immiscible in melted product ice to the interior of said casing below said support, means for collecting liquids draining through said support in said casing for gravity separation in said casing below said support and means at different levels of said casing below said support for removing condensed refrigerant and melted product ice respectively.

References Cited

UNITED STATES PATENTS

| | | | |
|---|---|---|---|
| 275,989 | 4/1883 | Byerley | 23—311 |
| 492,929 | 3/1893 | Sundstrom | 23—311 |
| 1,500,096 | 7/1924 | Oxley | 23—311 |
| 2,251,515 | 8/1941 | Curll | 23—311 |
| 2,764,488 | 9/1956 | Slattery | 62—123 |
| 2,821,304 | 1/1958 | Zarchin | 62—123 |
| 2,940,541 | 6/1960 | Plant | 62—58 |
| 2,995,016 | 8/1961 | Beattie | 62—58 |
| 2,997,856 | 8/1961 | Pike | 62—58 |
| 3,093,975 | 6/1963 | Zarchin | 62—58 |
| 3,121,626 | 2/1964 | Zarchin. | |

FOREIGN PATENTS

| | | |
|---|---|---|
| 217,766 | 10/1958 | Australia. |
| 70,507 | 6/1946 | Norway. |

NORMAN YUDKOFF, *Primary Examiner.*

ROBERT A. O'LEARY, *Examiner.*

D. R. MATTHEWS, *Assistant Examiner.*

UNITED STATES PATENT OFFICE
CERTIFICATE OF CORRECTION

Patent No. 3,338,064                                            August 29, 1967

George B. Karnofsky

It is hereby certified that error appears in the above numbered patent requiring correction and that the said Letters Patent should read as corrected below.

Column 1, line 17, for "press" read -- pressure --; column 5, lines 58 and 68, column 6, line 18 and column 7, line 15, for "produce", each occurrence, read -- product --.

Signed and sealed this 3rd day of September 1968.

(SEAL)
Attest:

Edward M. Fletcher, Jr.                                EDWARD J. BRENNER

Attesting Officer                                               Commissioner of Patents